United States Patent
Bertin et al.

(10) Patent No.: US 6,294,609 B1
(45) Date of Patent: Sep. 25, 2001

(54) COMPOSITION BASED ON AN ETHYLENE-VINYL ALCOHOL COPOLYMER AND ITS USE

(75) Inventors: Denis Bertin, Motteville; Denis Germain, Serquigny, both of (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/487,203

(22) Filed: Jan. 19, 2000

(30) Foreign Application Priority Data

Jan. 19, 1999 (FR) .................................................. 99 00490

(51) Int. Cl.⁷ ............................ C08L 29/04; C08L 23/04; C08L 51/04; B32B 27/30
(52) U.S. Cl. ................................ 525/57; 525/57; 525/59; 525/60; 525/61; 428/523
(58) Field of Search ................................. 525/56, 57, 59, 525/60, 61; 428/523

(56) References Cited

U.S. PATENT DOCUMENTS

| | | | | |
|---|---|---|---|---|
| 5,177,138 | * | 1/1993 | Moriyama et al. | 524/437 |
| 5,322,877 | | 6/1994 | Moriyama et al. | 524/399 |
| 6,087,001 | * | 7/2000 | Jacquemet et al. | 428/402 |

FOREIGN PATENT DOCUMENTS

| | | |
|---|---|---|
| 0 560 369 | 9/1993 | (EP) . |
| 0560369 | 9/1993 | (EP) . |
| 0 742 236 | 11/1996 | (EP) . |
| 0742236 | 11/1996 | (EP) . |
| 5255555 | 10/1993 | (JP) . |
| 8165397 | 6/1996 | (JP) . |
| 97/27259 | 7/1997 | (WO) . |
| 9727259 | 7/1997 | (WO) . |

OTHER PUBLICATIONS

Chemical Abstracts vol. 125, No. 16; Oct. 14, 1996; abstract No. 197454.
Chemical Abstracts vol. 120, No. 4; Jan. 24, 1994; abstract No. 32308.

* cited by examiner

Primary Examiner—Jeffrey Mullis
(74) Attorney, Agent, or Firm—Millen, White, Zelano & Branigan, P.C.

(57) ABSTRACT

Particularly useful as a barrier layer in packaging, e.g. multilayer structures, is a composition based on an ethylene-vinyl alcohol copolymer comprising:

- 50 to 98% by weight of an EVOH copolymer
- 1 to 50% by weight of a polyethylene (A)
- 1 to 15% by weight of a polyethylene (B) being a blend of a polyethylene (B1) and a polyethylene (B2) chosen from elastomers, very-low-density polyethylenes and metallocene polyethylenes, the blend of (B1) and (B2) being cografted by an unsaturated carboxylic acid or a functional acid derivative thereof.

8 Claims, No Drawings

COMPOSITION BASED ON AN ETHYLENE-VINYL ALCOHOL COPOLYMER AND ITS USE

CROSS REFERENCE TO RELATED APPLICATION

This application is related to a concurrently filed application entitled, "A Copolyamide-Containing Composition Based On An Ethylene-Vinyl Alcohol Copolymer" the inventors being, Denis Bertin, Yves Germain, and Patrice Robert, Attorney Docket Number ATOCM-166 based on priority French application 99/00491 filed Jan. 19, 1999, said application being incorporated by reference herein.

SUMMARY OF THE INVENTION

The present invention relates to a composition based on an ethylene-vinyl alcohol copolymer (EVOH) and to its use.

EVOH copolymers are a barrier to many gases and in particular to oxygen. Many articles of food packaging comprise a layer consisting of an EVOH film.

The present invention relates more particularly to compositions comprising (the total being 100%):
- 50 to 98% by weight of an EVOH copolymer
- 1 to 50% by weight of a polyethylene (A)
- 1 to 15% by weight of a polyethylene (B) consisting of a blend of a polyethylene (B1) and a polyethylene (B2) chosen from elastomers, very-low-density polyethylenes and metallocene polyethylenes, the blend of (B1) and (B2) being cografted by an unsaturated carboxylic acid or a functional derivative of this acid.

BACKGROUND OF THE INVENTION

In general, EVOH copolymers have various excellent properties such as oxygen impermeability, mechanical strength, etc., and find application, as they are, in many uses as films, sheets, materials for containers, textile fibers, etc. However, this copolymer gives rise to a variation in the thickness of the product in the molding process for manufacturing a film or a sheet, with a consequent reduction in the marketability of the product, and, because of the shortcoming in stretchability and flexibility, gives rise to non-uniform drawing during deep drawing and other processes involving a stretching force, or pinholes during the use of the product, thus imposing serious limitations on its application as a raw material for packaging. The oxygen barrier of EVOH copolymers is also greatly reduced when the relative humidity (RH) increases.

In order to overcome these drawbacks, it has been attempted to laminate a material made of an impermeable resin, such as a polyolefin film, on a sheet of EVOH copolymer or to improve the stretchability and flexibility of the molding by incorporating a polyolefin into the EVOH copolymer.

Application JP 05098084, published on Apr. 20, 1993, describes blends of 5 to 80 parts of polyethylene, 10 to 90 parts of EVOH and 10 to 90 parts of polyethylene grafted by an unsaturated carboxylic acid necessary for making the polyethylene and EVOH compatible.

It has been found that these compositions exhibit an oxygen barrier only if EVOH is the major component in the blend and that this also depends on the compatibilizer. However, compatibilization between EVOH and polyethylene using the grafted polyethylene described is not very good, the blend is not reproducible and it is difficult to make it into film.

U.S. Pat. No. 5,322,877 describes compositions similar to the previous ones but comprising, in addition, a salt of an alkali metal and a fatty acid. The amount of EVOH is from 30 to 70% of the whole consisting of the EVOH, the polyethylene and the granted polyethylene.

DETAILED DESCRIPTION OF THE INVENTION

The compositions of the present invention are a barrier to oxygen and are easily convertible. Other advantages will be described in the text.

The invention will now be described in detail.

The EVOH copolymer is also called a saponified ethylene-vinyl acetate copolymer. The saponified ethylene-vinyl acetate copolymer to be employed according to the present invention is a copolymer having an ethylene content of 20 to 60 mol %, preferably 25 to 55 mol %, the degree of saponification of its vinyl acetate component not being less than 95 mol %.

With an ethylene content of less than 20 mol %, the property of oxygen impermeability under high humidity conditions is not as high as would be desired, whereas an ethylene content exceeding 60 mol % leads to reductions in the oxygen impermeability property, in the printability and in other physical properties. When the degree of saponification or of hydrolysis is less than 95 mol %, the oxygen impermeability property and the wet strength are sacrificed. Among these saponified copolymers, those which have melt flow indices in the range of 0.5 to 100 g/10 minutes are particularly useful.

It should be understood that this saponified copolymer may contain small amounts of other comonomer ingredients, including ($\alpha$-olefins, such as propylene, isobutene, $\alpha$-octene, $\alpha$-dodecene, $\alpha$-octadecene, etc., unsaturated carboxylic acids or their salts, partial alkyl esters, complete alkyl esters, nitriles, amides and anhydrides of the said acids, and unsaturated sulphonic acids or their salts.

The oxygen permeability of the EVOH copolymer films, measured according to ASTM D 3985, is expressed in $cm^3$ of oxygen per $m^2$ for 24 hours for a pressure difference of 1 bar and a thickness of 25 $\mu m$. To simplify matters, the oxygen permeability is called $O_2GTR$ in the rest of the text.

$O_2GTR$ varies inversely proportionally to the thickness of the film.

An EVOH comprising 38 mol % of ethylene units has an $O_2GTR$ of 0.72 at 0% RH and 3.1 at 75% RH.

An EVOH comprising 29 mol % of ethylene units has an $O_2GTR$ of 0.1 at 0% RH and 1.41 at 75% RH. These grades are produced on an industrial scale and are commercially available.

One or other of these grades is used in different thicknesses depending on the required barrier (type of product to be preserved, preservation time, etc.). The Applicant has discovered that the compositions of the invention, based on an EVOH copolymer containing 29 mol % ethylene, have, in film form, the same barrier properties as a film essentially consisting of an EVOH copolymer containing 38 mol % ethylene but can be very easily converted. This is because the EVOH copolymer, although it is a thermoplastic, is very rigid. Its flexural modulus is about 2000 MPa. The compositions of the invention have a flexural modulus of 1500 MPa as soon as the proportion of polyethylene (A) is at least 15% by weight.

The invention is particularly suitable for EVOH copolymers having an ethylene content ranging from 25 to 45 mol % and MFIs (Melt Flow Index according to ASTM D 1238) ranging from 1.5 to 4 (g/10 minutes at 190° C./2.16 kg) and from 5 to 30 (g/10 minutes at 230° C./2.16 kg).

With regard to the polyethylene (A), this is chosen from ethylene homopolymers or ethylene copolymers.

By way of comonomers, mentioned may be made of:

alpha-olefins, advantageously those having from 3 to 30 carbon atoms.

Examples of alpha-olefins having 3 to 30 carbon atoms as possible comonomers comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-dococene, 1-tetracocene, 1-hexacocene, 1-octacocene and 1-triacontene. These alpha-olefins may be used by themselves or as a mixture of two or more of them;

the esters of unsaturated carboxylic acids such as, for example, alkyl (meth)acrylates, the alkyls possibly having up to 24 carbon atoms.

Examples of alkyl acrylates or methacrylates are, especially, methyl methacrylate, ethyl acrylate, n-butyl acrylate, isobutyl acrylate and 2-ethylhexyl acrylate;

vinyl esters of saturated carboxylic acids such as, for example, vinyl acetate or vinyl propionate;

unsaturated epoxides.

Examples of unsaturated epoxides are especially:

aliphatic glycidyl esters and ethers, such as allyl glycidyl ether, vinyl glycidyl ether, glycidyl maleate, glycidyl itaconate, glycidyl acrylate and glycidyl methacrylate, and alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 2-methyl-5-norbornene-2-carboxylate and di-glycidyl endo-cis-bicyclo[2.2.1]hept-5-ene-2,3-dicar-boxylate;

unsaturated carboxylic acids, their salts and their anhydrides.

Examples of anhydrides of an unsaturated dicarboxylic acid are, especially, maleic anhydride, itaconic anhydride, citraconic anhydride and tetrahydrophthalic anhydride;

dienes such as, for example, 1,4-hexadiene.

(A) may comprise several comonomers.

Advantageously, polymer (A), which may be a blend of several polymers, comprises at least 50% and preferably 75% (in moles) of ethylene. The density of (A) may be between 0.86 and 0.98 g/cm$^3$. The MFI (viscosity index at 190° C./2.16 kg) is advantageously between 1 and 1000 g/10 min.

By way of example of polymers (A), mention may be made of:

low-density polyethylene (LDPE);

high-density polyethylene (HDPE);

linear low-density polyethylene (LLDPE);

very low-density polyethylene (VLDPE);

polyethylene obtained by metallocene catalysis, that is to say polymers obtained by the copolymerization of ethylene and of an alpha-olefin such as propylene, butene, hexene or octene in the presence of a single-site catalyst generally consisting of a zirconium or titanium atom and of two alkyl cyclic molecules linked to the metal. More specifically, the metallocene catalysts are usually composed of two cyclopentadiene rings linked to the metal. These catalysts are frequently used with aluminoxanes as cocatalysts or activators, preferably methyl aluminoxane (MAO). Hafnium may also be used as the metal to which the cyclopentadiene is fixed. Other metallocenes may include transition metals of Groups IVAN, VA and VIA. Metals from the series of lanthanides may also be used;

EPR (ethylene-propylene rubber) elastomers;

EPDM (ethylene-propylene-diene monomer) elastomers;

ethylene-alkyl (meth)acrylate copolymers possibly containing up to 60%, and preferably 2 to 40%, by weight of (meth)acrylate;

ethylene-alkyl (meth)acrylate-maleic anhydride copolymers obtained by copolymerization of the three monomers, the proportions of (meth)acrylate being as in the above copolymers, the amount of maleic anhydride being up to 10% and preferably 0.2 to 6% by weight;

ethylene-vinyl acetate-maleic anhydride copolymers obtained by copolymerization of the three monomers, the proportions being the same as in the previous copolymer.

Advantageously, (A) is chosen from LLDPEs having a relative density of less than 0.920 and metallocene polyethylenes having a relative density of 0.870 to 0.900, and preferably metallocene polyethylenes. The MFI of (A) is advantageously between 0.1 and 10 (190° C./2.16 kg).

As regards polyethylene (B), this results from the grafting of a blend of (B1) and (B2) which is grafted by an unsaturated carboxylic acid or a functional derivative of this acid.

(B1) may be chosen from the polyethylenes mentioned in the case of polyethylene (A) above. Preferably, (B1) is chosen from LLDPEs and metallocene polyethylenes.

By way of example of elastomers (B2), mention may be made of ethylene/propylene (EPR), ethylene/propylene/diene, ethylene/1-butene, ethylene/1butene/diene, ethylene/propylene/1-butene/diene and ethylene/4-methyl-1-pentene copolymers, and blends of at least two of these elastomers.

By way of example of elastomers, mention may also be made of styrene/butadiene/styrene block copolymers (SBS), styrene/ethylene-butene/styrene copolymers (SEBS) or styrene/isoprene/styrene block copolymers (SIS).

(B2) may also be a VLDPE (very low-density) polyethylene. These are copolymers of ethylene and an alpha-olefin, the relative density of which may be between 0.860 and 0.910.

(B2) may also be a metallocene polyethylene.

The relative density of (B2) is advantageously between 0.860 and 0.880.

That is to say (B2) represents a range of polymers, ranging from thermoplastic resins to elastomers. Preferably, (B2) is an elastomer, ethylene/propylene copolymers, ethylene/1-butene copolymers and ethylene-octene copolymers being those that are preferred the most. Preferably, the ethylene/propylene copolymer and the ethylene/1-butene copolymer have a melt flow index (measured at 190° C. according to ASTM D1238-65T) of 0.1 to 20 and an ethylene content of 60 to 90 mol %.

Advantageously, 60 to 90 parts of (B1) are used per 40 to 10 parts of (B2).

The blend of (B1) and (B2) is grafted with an unsaturated carboxylic acid, that is to say (B1) and (B2) are cografted. It would not be outside the scope of the invention to use a functional derivative of this acid, that is to say (B1) and (B2) are cografted.

Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of the unsaturated carboxylic acids.

Unsaturated dicarboxylic acids having 4 to 10 carbon atoms and their functional derivatives, particularly their anhydrides, are particularly preferred grafting monomers. These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides.

Examples of other grafting monomers comprise $C_1$–$C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate, and diethyl itaconate; amide derivatives of unsaturated carboxylic acids, such as acrylamide, methacrylamide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, the monoamide of fumaric acid, the diamide of fumaric acid, the N-monoethylamide of fumaric acid, the N,N-diethylamide of fumaric acid, the N-monobutylamide of fumaric acid and the N,N-dibutylamide of fumaric acid; imide derivatives of unsaturated carboxylic acids, such as maleimide, N-butylmaleimide and N-phenylmaleimide; and metal salts of unsaturated carboxylic acids such as sodium acrylate, sodium methacrylate, potassium acrylate and potassium methacrylate. Maleic anhydride is preferred.

Various known processes can be used to graft a grafting monomer onto the blend of (B1) and (B2).

For example, this may be achieved by heating polymers (B1) and (B2) to a high temperature, approximately 150° C. to approximately 300° C., with or without the presence of a solvent and with or without a radical initiator. Suitable solvents that can be used in this reaction are benzene, toluene, xylene, chlorobenzene, cumene, etc. Suitable radical initiators that can be used comprise tert-butyl hydroperoxide, cumene hydroperoxide, diisopropylbenzene hydroperoxide, di-tert-butyl peroxide, tert-butylcumyl peroxide, dicumyl peroxide, 1,3-bis(tert-butylperoxyisopropyl)benzene, acetyl peroxide, benzoyl peroxide, isobutyryl peroxide, bis(3,5,5-trimethylhexanoyl) peroxide and methyl ethyl ketone peroxide.

In the blend of (B1) and (B2), modified by grafting, obtained in the abovementioned manner, the amount of the grafting monomer may be suitably chosen but it is preferably from 0.01 to 10%, better still from 600 ppm to 6%, with respect to the weight of grafted (B1) and (B2).

The amount of the grafted monomer is determined by quantitatively determining the succinic functional groups by FTIR spectroscopy.

The MFI of (B), that is to say of (B1) and (B2), that have been cografted, is 0.1 to 3.

According to one particular embodiment of the invention, polymer (B), that is to say cografted (B1) and (B2), is such that:

(B1) comprises at least 75 mol % ethylene and has an $MFI_2/[\eta]^{-8.77}$ ratio in absolute value greater than 15;

(B2) comprises at least 50 mol % ethylene;

(B2) has an $MFI_2/[\eta]^{-8.77}$ ratio in absolute value greater, than 15;

its ethylene content is not less than 70 mol %.

According to another preferred embodiment, the $MFI_{10}/MFI_2$ ratio is between 5 and 20, where $MFI_2$ is the melt flow index at 190° C. under a load of 2.16 kg, measured according to ASTM D1238, and $MFI_{10}$ is the melt flow index at 190° C. under a load of 10 kg according to ASTM D1238. The intrinsic viscosity $[\eta]$ denotes the viscosity index dl/g of a polymer measured in a decalin solution at 135° C.

Particularly advantageous compositions comprise (the total being 100%):

55 to 98% EVOH copolymer 1 to 44% polyethylene (A)

1 to 10% polyethylene (B)

and preferably 55 to 75% EVOH copolymer 15 to 25% polyethylene (A)

5 to 15% polyethylene (B).

The compositions of the invention may be prepared by melt blending them in extruders (single-screw or twin-screw), BUSS kneaders, BRABENDER mixers and, in general, the usual devices for blending thermoplastics.

The compositions of the invention are particularly suitable for conversion by the usual techniques for thermoplastics. They may be made into film, for example by casting or by extrusion-blowing.

The compositions of the invention are useful as a barrier layer in multilayer packaging. They comprise, for example, a polyolefin layer, a binder, a layer of the compositions of the invention, a binder layer and a polyolefin layer.

They may be in the form of flexible packaging or of bottles or containers.

Such packaging is manufactured by coextrusion or by injection-blow molding.

EXAMPLES

The following materials were used:

| | |
|---|---|
| EVOH E | ethylene-vinyl alcohol copolymer containing 38 mol % ethylene, having an MFI of 8 (210° C./2.16 kg), a melting point of 183° C., a crystallization temperature of 160° C. and a $T_g$ (glass transition temperature) of 61° C.; |
| EVOH D | ethylene-vinyl alcohol copolymer containing 29 mol % ethylene, having an MFI of 8 (210° C./2.16 kg), a melting point of 188° C., a crystallization temperature of 163° C. and a Tg (glass transition temperature) of 62° C.; |
| ENGAGE 8200 | metallocene polyethylene having an MFI of 5 (190° C./2.16 kg) and a relative density of 0.870; |
| ENGAGE 8150 | metallocene polyethylene having an MFI of 0.5 and a relative density of 0.870; |

-continued

| | |
|---|---|
| CLEARPLEX FFDO | LLDPE having an MFI of 0.8 (190° C./2.16 kg) and a relative density of 0.900. |
| OREVAC A | blend of 75 parts of (B1) and (B2) cografted by maleic anhydride. (B1) is an LLDPE containing 8 mol % octene, having an MFI of 4.4 (190° C./2.16 kg) and a relative density of 0.920 and $MFI_2/[\eta]^{-8.77} = 43.9$ (B2) is an ethylene-propylene copolymer containing 15.4% propylene, having an MFI of 0.2 (190° C./2.16 kg) and an $MFI_2/[\eta]^{-8.77} = 871.5$. |

Films 25 μm in thickness were prepared by extrusion casting. The oxygen permeability was measured by an OXTRAN 2/20 apparatus.

The results are given in Table 1 (in parts by weight).

TABLE 1

| Examples | 1 | 2 | 3 | 4 | 5 | 6 | 7 |
|---|---|---|---|---|---|---|---|
| EVOH E | 100 | | 70 | 70 | 70 | | |
| EVOH D | | 100 | | | | 70 | 70 |
| ENGAGE 8200 | | | 20 | | | 20 | |
| ENGAGE 8150 | | | | 20 | | | |
| CLEARFLEX FFDO | | | | | 20 | | 20 |
| OREVAC A | | | 10 | 10 | 10 | 10 | 10 |
| O₂GTR | | | | | | | |
| (1) 0% RH, 23° C. | 0.72 | 0.1 | 1.71 | 1.71 | 2.16 | 0.23 | 0.29 |
| 75% RH, 23° C. after 14 h of conditioning in water | 3.29 | | 8.18 | 7.75 | 9.02 | 6.87 | 7.90 |
| (2) 75% RH, 23° C. | 3.1 | 1.41 | 7.67 | 9.98 | 9.77 | 3.74 | 6.24 |
| (2)/(1) ratio, 75% RH O₂GTR/ 0% RH O₂GTR | 4 | 14.1 | 4 | 6 | 5 | 16 | 21 |

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/00490, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition based on an ethylene-vinyl alcohol (EVOH) copolymer comprising:

50 to 98% by weight of an EVOH copolymer 1 to 50% by weight of a polyethylene (A)

1 to 15% by weight of an acid grafted blend (B) of a polyethylene (B1) and a polyethylene (B2) chosen from elastomers, very-low-density polyethylenes and metallocene polyethylenes, the blend of (B1) and (B2) being cografted by an unsaturated carboxylic acid or a functional acid derivative thereof, (B1) and (B2) being different polyethylenes.

2. A composition according to claim 1, in which polyethylene (A) is an LLDPE or a metallocene polyethylene.

3. A composition according to claim 1, in which (B1) is chosen from LLDPEs and metallocene polyethylenes.

4. A multilayer structure comprising a layer of the composition according to claim 1.

5. Packaging, bottles or containers comprising the multilayer structure of claim 4.

6. A composition according to claim 1, wherein:

(B1) has a relative density of 0.870 to 0.900 and (B2) has a relative density of between 0.860 and 0.880, and lower than the relative density of (B1).

7. A composition according to claim 1, wherein:

(B) has an ethylene content of not less than 70%;

(B1) comprises at least 75 mol % of ethylene and has an $MFI_2/[\eta]^{-8.77}$ ratio in absolute value greater than 15; and (B2) comprises at least 50 mol % of ethylene; and an $MFI_2/[\eta]^{-8.77}$ ratio in absolute value greater than 15, $[\eta]$ denoting the intrinsic viscosity (dl/g) of a polymer measured in a decalin solution at 135° C.

8. A composition according to claim 7, in which (B) is such that the $MFI_{10}/MFI_2$ ratio is between 5 and 20, where $MFI_2$ is the melt flow index at 190° C. under a load of 2.16 kg, measured according to ASTM D1238, and $MFI_{10}$ is the melt flow index at 190° C. under a load of 10 kg according to ASTM D1238.

* * * * *